(12) United States Patent
Burke (10) Patent No.: US 10,982,725 B2
(45) Date of Patent: Apr. 20, 2021

(54) SWITCHABLE RATCHETING CLUTCH (71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1 day.

(21) Appl. No.: 16/533,856

(22) Filed: Aug. 7, 2019

(65) Prior Publication Data

US 2021/0040997 A1 Feb. 11, 2021

(51) Int. Cl.
*F16D 45/00* (2006.01)
*F16D 41/08* (2006.01)
*F16D 43/284* (2006.01)
*F16D 41/07* (2006.01)
*F16D 41/30* (2006.01)

(52) U.S. Cl.
CPC ........... *F16D 41/084* (2013.01); *F16D 41/07* (2013.01); *F16D 43/284* (2013.01); *F16D 45/00* (2013.01); *F16D 41/30* (2013.01)

(58) Field of Classification Search
CPC ...... F16D 41/084; F16D 43/284; F16D 45/00; F16D 41/07; F16D 41/30
See application file for complete search history.

(56) References Cited

U.S. PATENT DOCUMENTS

| | | | | |
|---|---|---|---|---|
| 6,814,201 | B2 * | 11/2004 | Thomas | F16D 41/125 192/43.1 |
| 7,101,306 | B2 | 9/2006 | Blair et al. | |
| 7,721,860 | B2 * | 5/2010 | Saka | F16D 41/16 192/43.1 |
| 7,743,678 | B2 * | 6/2010 | Wittkopp | F16D 41/14 74/339 |
| 7,766,790 | B2 * | 8/2010 | Stevenson | B60K 6/26 477/8 |
| 8,042,669 | B2 * | 10/2011 | Samie | F16D 41/12 192/43.1 |
| 8,042,670 | B2 * | 10/2011 | Bartos | F16D 41/16 192/43.1 |
| 8,276,725 | B2 * | 10/2012 | Swales | F16D 41/16 192/43.1 |

(Continued)

FOREIGN PATENT DOCUMENTS

JP 3715660 B2 11/2005
KR 10-1672982 B1 11/2016

*Primary Examiner* — David J Hlavka
(74) *Attorney, Agent, or Firm* — LeKeisha M. Suggs (57) ABSTRACT

A switchable ratcheting clutch achieves four different modes of operation based on a relative rotational position of a cam ring and an inner ring. In a central relative position, an outer ring can rotate freely in either direction with respect to the inner ring. In either extreme relative position, the outer ring is prevented from rotating in either direction relative to the inner ring. In intermediate positions one either side of the central position, the outer ring is permitted to rotate in one direction but not the other. A number of pawls are supported on the inner ring and pushed radially out of engagement with the outer ring by a spring on a spring cage. The spring cage moves with the cam ring between the one-way positions but the cam ring rotates relative to the spring cage when moving into the extreme positions.

16 Claims, 5 Drawing Sheets

(56) References Cited

U.S. PATENT DOCUMENTS

| | | | |
|---|---|---|---|
| 8,460,151 B2* | 6/2013 | Wittkopp | F16H 3/66 475/276 |
| 8,622,186 B2* | 1/2014 | Samie | F16D 41/14 192/85.48 |
| 8,899,395 B2* | 12/2014 | Holmes | F16D 41/16 192/43.1 |
| 9,726,236 B2 | 8/2017 | Papania | |
| 9,739,321 B2 | 8/2017 | Itagaki | |
| 10,760,624 B1* | 9/2020 | Samie | F16D 41/084 |
| 2006/0278487 A1* | 12/2006 | Pawley | F16D 41/125 192/43.1 |
| 2008/0169165 A1* | 7/2008 | Samie | F16D 41/14 192/43 |
| 2016/0265609 A1* | 9/2016 | Corsetti | F16D 41/30 |
| 2016/0327102 A1* | 11/2016 | Chen | F16D 41/16 |
| 2018/0100551 A1 | 4/2018 | Campton et al. | |
| 2018/0216676 A1 | 8/2018 | Geiser et al. | |
| 2018/0266503 A1 | 9/2018 | Shioiri et al. | |
| 2019/0032760 A1 | 1/2019 | Geiser et al. | |
| 2019/0063513 A1 | 2/2019 | Peglowski et al. | |
| 2019/0226534 A1* | 7/2019 | Cioc | F16D 27/118 |

\* cited by examiner

SWITCHABLE RATCHETING CLUTCH

TECHNICAL FIELD

The disclosure relates generally to the field of clutches. More particularly, the disclosure relates to a ratcheting clutch that is switchable among five modes including a free-free mode, two one-way modes, and two lock-lock modes.

BACKGROUND

Automotive transmissions establish a variety of selectable speed ratios between an engine and driven wheels. For discrete ratio transmissions, the speed ratio is typically selected by engaging particular clutches. A clutch restricts relative rotation between components, one or both of which is otherwise rotatable relative to the transmission case. Some clutches rely on friction to restrict relative motion. Ratcheting clutches, on the other hand, have pawls or other members that engage to stop relative motion in one direction and ratchet to permit relative motion in the opposite direction.

Some ratcheting clutches are completely passive devices. Other ratcheting clutches are switchable between modes. For example, a switchable ratcheting clutch may include a first mode in which relative rotation is permitted in both directions and a second mode in which relative rotation is permitted in only one direction. Previously known selectable four-mode ratcheting clutches are formed by combining multiple two-mode ratcheting clutches.

SUMMARY

A switchable clutch includes inner and outer rings, a cam ring, a plurality of pawls, and a plurality of ratcheting springs. The outer ring has an internal tooth profile and is supported for rotation with respect to the inner ring. The cam ring is supported for rotation through a first range with respect to the inner ring. The plurality of pawls is supported by the inner ring. Each if the plurality of ratcheting springs urges a respective pawl radially toward the cam ring and positions the respective pawl with respect to the outer ring based on a relative rotational position of the cam ring with respect to the inner ring. In a first relative rotational position, the respective pawl does not engage the outer ring. In a second relative rotational position, the respective pawl engages the tooth profile to prevent rotation of the outer ring with respect to the inner ring in a first direction while permitting relative rotation in a second direction. In a third relative rotational position, the respective pawl engages the tooth profile to prevent rotation of the outer ring with respect to the inner ring in the second direction while permitting relative rotation in the first direction. In fourth and fifth relative rotational positions, the respective pawl engages the tooth profile to prevent rotation of the outer ring with respect to the inner ring in both the first and second directions. The first relative rotational position may be between the second relative rotational position and the third relative rotational position. The second relative rotational position may be between the first relative rotational position and the fourth relative rotational position. The third relative rotational position may be between the first relative rotational position and the fifth relative rotational position. A spring cage may be supported for rotation through a second range less than the first range with respect to the inner ring. The ratcheting springs may be secured to the spring cage. A plurality of return springs may act between the cam ring and the spring cage. Rotation of the spring cage with respect to the inner ring may change a center of force of the ratcheting springs on the pawls thereby urging the pawls to tilt into engagement with the tooth profile. Each pawl may include first and second arms. The first arm may be configured to engage the tooth profile to prevent relative rotation in the first direction. The second arm may be configured to engage the tooth profile to prevent relative rotation in the second direction.

A method of operating a switchable includes rotating a cam ring with respect to a first ring to transition among operating modes. The cam ring is rotated clockwise with respect to the first ring to transition from a free-free mode to a first one-way mode. In the free-free mode, a second ring is permitted to rotate in either direction with respect to the first ring. In the first one-way mode, the second ring is permitted to rotate in a first direction with respect to the first ring but is prevented from rotating in a second direction with respect to the first ring. The cam ring is rotated further clockwise with respect to the first ring to transition from the first one-way mode to a first lock-lock mode. In the first lock-lock mode, the second ring is prevented from rotation in either direction with respect to the first ring. The cam ring is rotated counter-clockwise with respect to the first ring to transition from the free-free mode to a second one-way mode. In the second one-way mode, the second ring is permitted to rotate in the second direction with respect to the first ring but is prevented from rotating in the first direction with respect to the first ring. The cam ring may be rotated further counter-clockwise with respect to the first ring to transition from the second one-way mode to a second lock-lock mode. In the second lock-lock mode, the second ring is prevented from rotation in either direction with respect to the first ring. The first direction may be counter-clockwise and the second direction clockwise. In the free-free mode, a ratcheting spring may be fixed to a spring cage and may urge a pawl radially out of engagement with the second ring. Transitioning from the free-free mode to the first one-way mode may include rotating the spring cage clockwise via a linkage between the cam ring and the spring cage, thereby changing a center of force of the ratcheting spring against the pawl urging the pawl to rotate into engagement with a tooth profile of the second ring. Transitioning from the first one-way mode to the first lock-lock mode may include restraining the spring cage from further rotation and forcing the pawl via a ramp of the cam ring into engagement with two teeth of the tooth profile of the second ring.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

FIGS. 1-4 illustrate a selectable clutch in a free-free mode. In the free-free mode, outer ring 10 is free to rotate in either direction with respect to inner ring 12. The actuation mechanism is simplest if inner ring 12 is stationary with respect to a gearbox housing. Throughout this document, any description of movement of parts should be interpreted as movement relative to the inner ring 12. Cam ring 14 is supported for rotation through a limited range of angles. The desired mode of the selectable clutch is activated by rotating cam ring 14 to corresponding positions within this range of motion. In addition to the free-free mode illustrated in FIGS. 1-4, two one-way modes and two lock-lock modes are available. In the one-way modes, outer ring 10 rotates freely in one direction but is prevented from rotation in the other direction. In the lock-lock modes, outer ring 10 is prevented from rotating in either direction.

Figure 1:
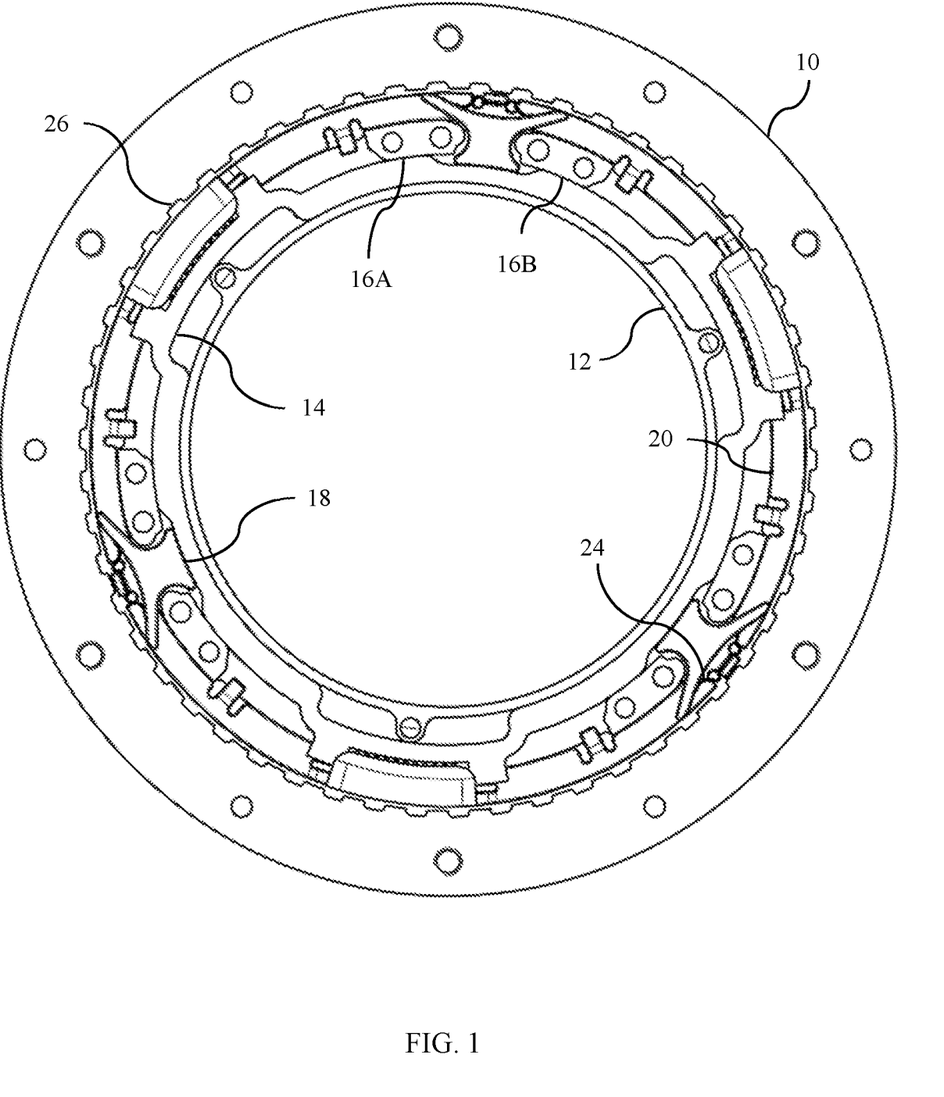
FIG. 1 is an end-view of a switchable ratcheting clutch in a free-free mode.
Figure 2:
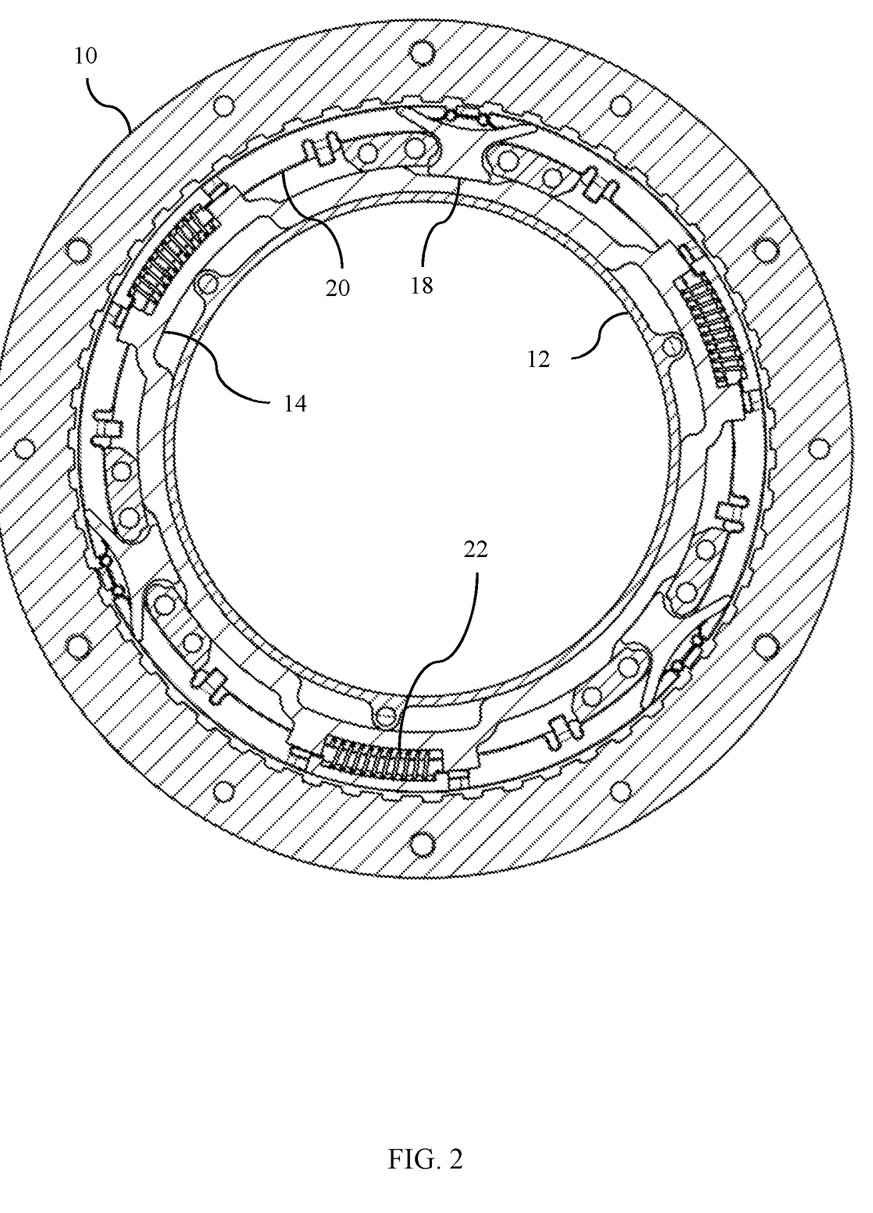
FIG. 2 is a section view of the switchable ratcheting clutch of FIG. 1 in the free-free mode.
Figure 3:
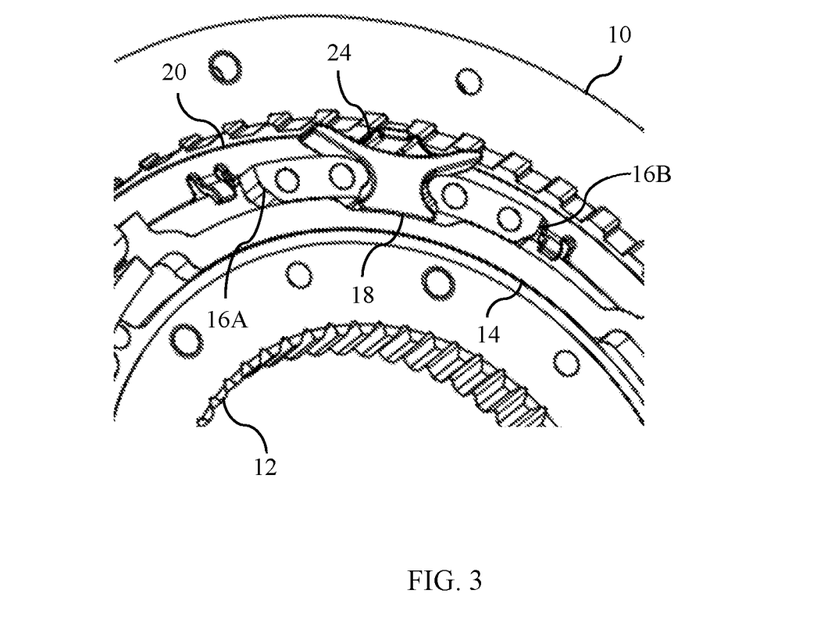
FIG. 3 is a first pictorial view of the switchable ratcheting clutch of FIG. 1 in the free-free mode.
Figure 4:
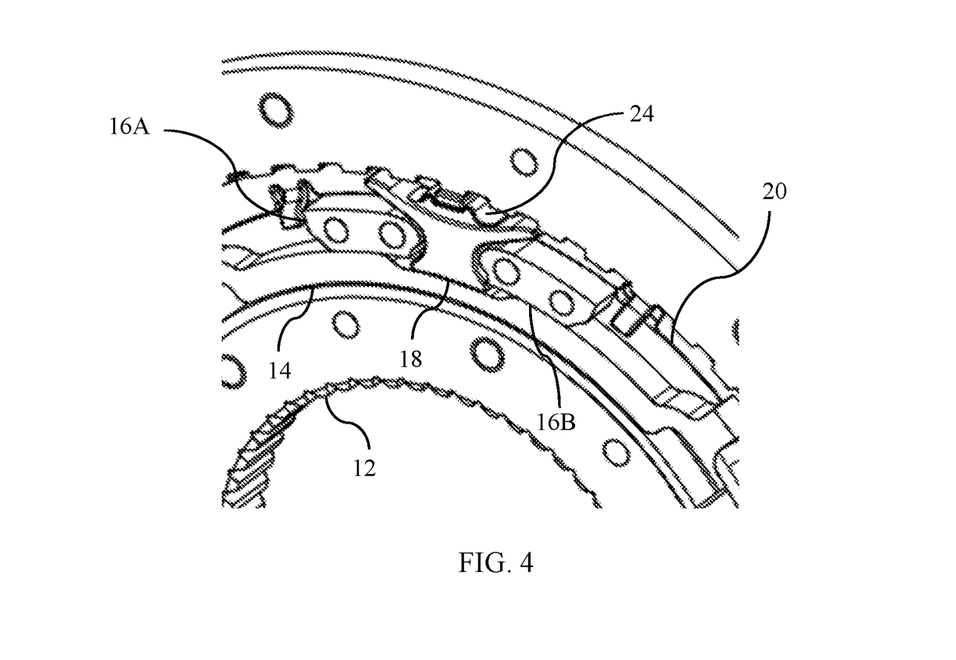
FIG. 4 is a second pictorial view of the switchable ratcheting clutch of FIG. 1 in the free-free mode.

A number of pairs of lugs 16A and 16B protrude axially from inner ring 12. A number of pawls 18 are supported circumferentially between the lugs. The shapes of the lugs and interfacing surfaces of the pawls are selected to permit the pawls some range of radial motion and some range of rotation or tilting motion. A spring cage 20 is supported for rotation through a limited range of angles. The range of motion of spring cage 20 is substantially less than the range of motion of cam ring 14. As best seen in FIG. 2, return spring 22 urges spring cage 20 to be aligned rotationally with cam ring 14. Ratcheting springs 24 are fixed to spring cage 20 and push against pawls 18. As best seen in FIGS. 3 and 4, ratcheting spring 24 is secured to a tab that extends axially from spring cage 20 between outer ring 10 and pawl 18. Ratcheting spring 24 may be a leaf spring that pushes against the pawl in two different spots. In the free-free mode illustrated in FIGS. 1-4, the spring force is centered on the pawl and acts to urge the pawl radially inward toward the cam ring 14. In this position, the entire pawl 18 is held away from the inner tooth profile 26 of the outer ring. Since the pawls do not contact the outer ring 10, they do not restrict rotation of outer ring 10.

Figure 5:
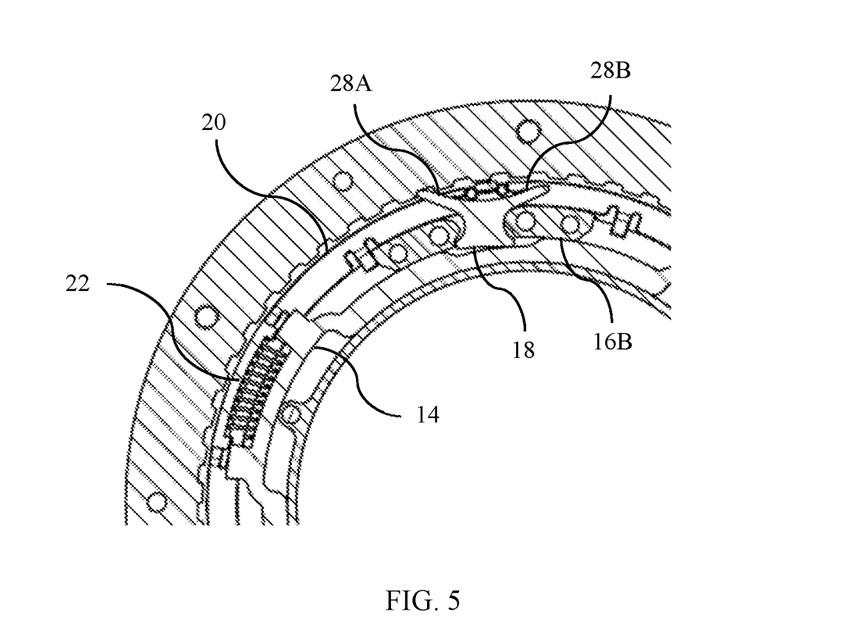
FIG. 5 is a partial section view of the switchable ratcheting clutch of FIG. 1 in a first one-way mode.

FIG. 5 illustrates the mode of the clutch in the first one-way mode, in which the outer ring 10 is free to rotate counter-clockwise with respect to the inner ring 12 but is restrained from rotating clockwise with respect to inner ring 12. This mode is activated from the free-free mode by rotating cam ring 14 clockwise. In response, return spring 22 forces spring cage 20 to also rotate clockwise. Pawl 18 includes two arms 28A and 28B. As spring cage 20 rotates with respect to inner ring 12, the force of the ratcheting spring 24 is offset on the pawl 18, causing the pawl to tilt into a position in which first arm 28A engages one of the teeth of tooth profile 26. This engagement precludes clockwise rotation of outer ring 10. Any clockwise torque on outer ring 12 is transmitted through pawl 18 to inner ring 12 via lug 16B. When outer ring 10 rotates in a counter-clockwise direction, teeth of tooth profile 26 push first arm 28A out of the way against the force of ratcheting spring 24. At most a small level of parasitic drag torque is transmitted in the counter-clockwise direction from outer ring 10 to inner ring 12. To avoid large forces associated with the sudden stoppage of outer ring 10, the transition from the free-free mode to this first one-way mode should preferably occur while the outer ring is rotating counter-clockwise or at least below a threshold clockwise speed.

Figure 6:
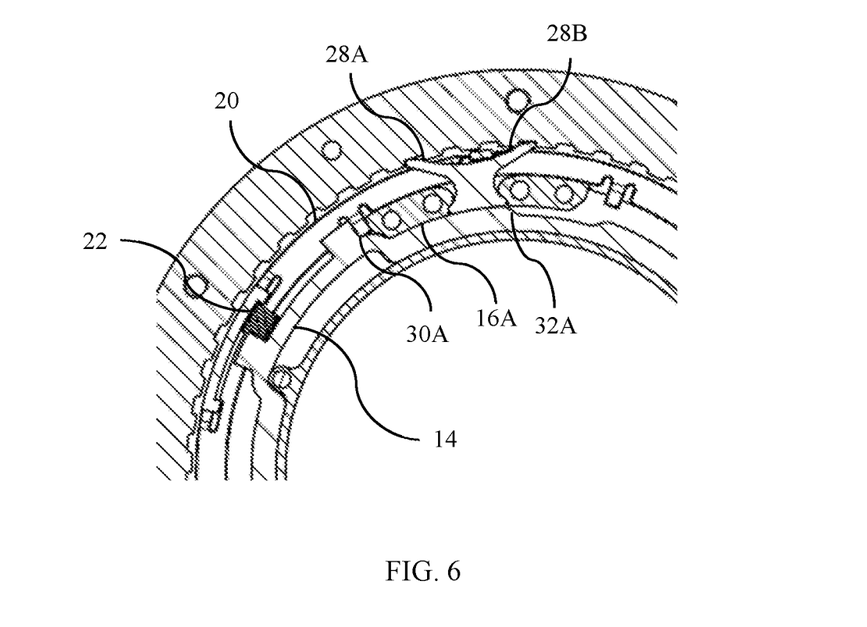
FIG. 6 is a partial section view of the switchable ratcheting clutch of FIG. 1 in a first lock-lock mode.

FIG. 6 illustrates the mode of the clutch in the first lock-lock mode, in which relative rotation is precluded in both directions. This first lock-lock mode is activated from the first one-way mode by rotating cam ring 14 further clockwise. Tab 30A of spring cage 20 contacts lug 16A of inner ring 12 preventing further clockwise rotation of spring cage 20. Therefore, the further rotation of cam ring 14 causes return spring 22 to become compressed. As cam ring 14 is rotated clockwise, cam profile 32A of cam ring 14 forces pawl 18 radially outward, compressing ratcheting spring 24. In the radially extended position, both first arm 28A and second arm 28B engage respective teeth of tooth profile 26. As in the first one-way mode described above, any clockwise torque on outer ring 12 is transmitted through pawl 18 to inner ring 12 via lug 16B. Also, any counter-clockwise torque on outer ring 12 is transmitted through pawl 18 to inner ring 12 via lug 16A. To avoid large forces associated with the sudden stoppage of outer ring 10, the transition from the first one-way mode to this first lock-lock mode should preferably occur while the outer ring is stationary or at least below a threshold counter-clockwise speed.

Figure 7:
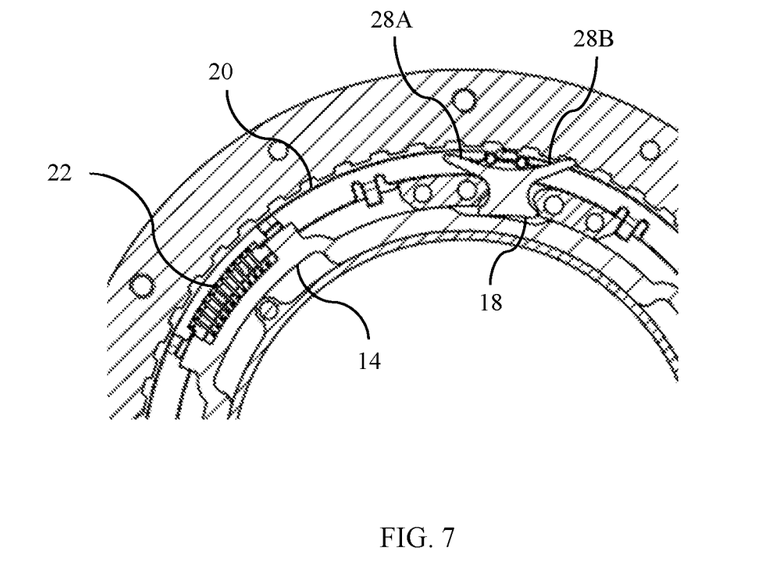
FIG. 7 is a partial section view of the switchable ratcheting clutch of FIG. 1 in a second one-way mode.

FIG. 7 illustrates the mode of the clutch in the second one-way mode, in which the outer ring 10 is free to rotate clockwise with respect to the inner ring 12 but is restrained from rotating counter-clockwise with respect to inner ring 12. This mode is activated from the free-free mode by rotating cam ring 14 counter-clockwise. In response, return spring 22 forces spring cage 20 to also rotate counter-clockwise. As spring cage 20 rotates with respect to inner ring 12, the force of the ratcheting spring 24 is offset on the pawl 18, causing the pawl to tilt into a position in which second arm 28B engages one of the teeth of tooth profile 26. This engagement precludes counter-clockwise rotation of outer ring 10. Any counter-clockwise torque on outer ring 12 is transmitted through pawl 18 to inner ring 12 via lug 16A. When outer ring 10 rotates in a clockwise direction, teeth of tooth profile 26 push second arm 28B out of the way against the force of ratcheting spring 24. At most a small level of parasitic drag torque is transmitted in the clockwise direction from outer ring 10 to inner ring 12. To avoid large forces associated with the sudden stoppage of outer ring 10, the transition from the free-free mode to this second one-way mode should preferably occur while the outer ring is rotating clockwise or at least below a threshold counter-clockwise speed.

Figure 8:
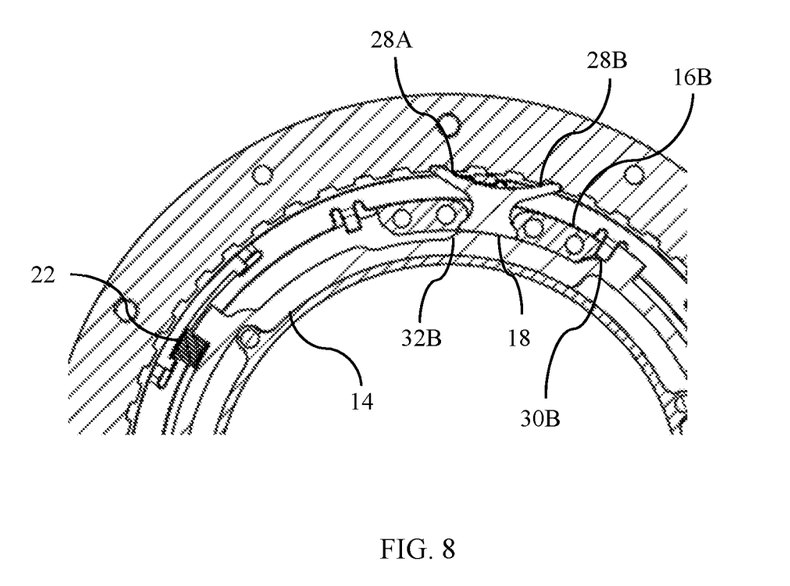
FIG. 8 is a partial section view of the switchable ratcheting clutch of FIG. 1 in a second lock-lock mode.

FIG. 8 illustrates the mode of the clutch in the second lock-lock mode, in which relative rotation is precluded in both directions. This second lock-lock mode is activated from the second one-way mode by rotating cam ring 14 further counter-clockwise. Tab 30B of spring cage 20 contacts lug 16B of inner ring 12 preventing further counter-clockwise rotation of spring cage 20. Therefore, the further rotation of cam ring 14 causes return spring 22 to become compressed. As cam ring 14 is rotated counter-clockwise, cam profile 32B of cam ring 14 forces pawl 18 radially outward, compressing ratcheting spring 24. In the radially extended position, both first arm 28A and second arm 28B engage respective teeth of tooth profile 26. As in the second one-way mode described above, any counter-clockwise torque on outer ring 12 is transmitted through pawl 18 to inner ring 12 via lug 16A. Also, any clockwise torque on outer ring 12 is transmitted through pawl 18 to inner ring 12 via lug 16B. To avoid large forces associated with the sudden stoppage of outer ring 10, the transition from the second one-way mode to this second lock-lock mode should preferably occur while the outer ring is stationary or at least below a threshold clockwise speed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A switchable clutch comprising:
   a first ring;
   a second ring having a tooth profile and supported for rotation with respect to the first ring;
   a cam ring supported for rotation through a first range with respect to the first ring;
   a plurality of pawls supported by the first ring; and
   a plurality of ratcheting springs, each ratcheting spring urging a respective pawl toward the cam ring and positioning the respective pawl with respect to the second ring based on a relative rotational position of the cam ring with respect to the first ring, such that
   in a first relative rotational position, the respective pawl does not engage the second ring,
   in a second relative rotational position, the respective pawl engages the tooth profile to prevent rotation of the second ring with respect to the first ring in a first direction while permitting relative rotation in a second direction,
   in a third relative rotational position, the respective pawl engages the tooth profile to prevent rotation of the second ring with respect to the first ring in the second direction while permitting relative rotation in the first direction,
   in a fourth relative rotational position, the respective pawl engages the tooth profile to prevent rotation of the second ring with respect to the first ring in both the first and second directions;
   wherein each pawl of the plurality of pawls comprises;
   a first arm configured to engage the tooth profile to prevent relative rotation in the first direction; and
   a second arm configured to engage the tooth profile to prevent relative rotation in the second direction.

2. The switchable clutch of claim 1 wherein the first relative rotational position is between the second relative rotational position and the third relative rotational position.

3. The switchable clutch of claim 2 wherein the second relative rotational position is between the first relative rotational position and the fourth relative rotational position.

4. The switchable clutch of claim 3 wherein:
   in a fifth relative rotational position of the cam ring with respect to the first ring, each ratcheting spring positions the respective pawl with respect to the second ring such that the respective pawl engages the tooth profile to prevent rotation of the second ring with respect to the first ring in both the first and second directions; and
   the third relative rotational position is between the first relative rotational position and the fifth relative rotational position.

5. The switchable clutch of claim 1 further comprising:
   a spring cage supported for rotation through a second range less than the first range with respect to the first ring, wherein the ratcheting springs are secured to the spring cage; and
   a plurality of return springs acting between the cam ring and the spring cage.

6. The switchable clutch of claim 5 wherein rotation of the spring cage with respect to the first ring changes a center of force of the ratcheting springs on the pawls thereby urging the pawls to tilt into engagement with the tooth profile.

7. A method of operating a switchable clutch comprising:
   rotating a cam ring clockwise with respect to a first ring to transition from a free-free mode to a first one-way mode wherein, in the free-free mode, a second ring is permitted to rotate in either direction with respect to the first ring and wherein, in the first one-way mode, the second ring is permitted to rotate in a first direction with respect to the first ring but is prevented from rotating in a second direction with respect to the first ring;
   rotating the cam ring further clockwise with respect to the first ring to transition from the first one-way mode to a first lock-lock mode wherein, in the first lock-lock mode, the second ring is prevented from rotation in either direction with respect to the first ring;
   rotating the cam ring counter-clockwise with respect to the first ring to transition from the free-free mode to a second one-way mode wherein in the second one-way mode, the second ring is permitted to rotate in the second direction with respect to the first ring but is prevented from rotating in the first direction with respect to the first ring; and rotating the cam ring further counter-clockwise with respect to the first ring to transition from the second one-way mode to a second lock-lock mode wherein the second lock-lock mode, the second ring is prevented from rotation in either direction with respect to the first ring.

8. The method of claim 7 wherein:
the first direction is counter-clockwise; and
the second direction is clockwise.

9. The method of claim 7 wherein:
in the free-free mode, a ratcheting spring fixed to a spring cage urges a pawl radially out of engagement with the second ring; and
transitioning from the free-free mode to the first one-way mode comprises rotating the spring cage clockwise via a linkage between the cam ring and the spring cage, thereby changing a center of force of the ratcheting spring against the pawl urging the pawl to rotate into engagement with a tooth profile of the second ring.

10. The method of claim 9 wherein transitioning from the first one-way mode to the first lock-lock mode comprises:
restraining the spring cage from further rotation; and
forcing the pawl via a ramp of the cam ring into engagement with two teeth of the tooth profile of the second ring.

11. A switchable clutch comprising:
an inner ring;
an outer ring having an internal tooth profile and supported for rotation with respect to the inner ring;
a cam ring supported for rotation through a first range with respect to the inner ring;
a plurality of pawls supported by the inner ring;
a plurality of ratcheting springs, each ratcheting spring urging a respective pawl radially toward the cam ring and positioning the respective pawl with respect to the outer ring based on a relative rotational position of the cam ring with respect to the inner ring, such that
in a first relative rotational position, the respective pawl does not engage the outer ring,
in a second relative rotational position, the respective pawl engages the tooth profile to prevent rotation of the outer ring with respect to the inner ring in a first direction while permitting relative rotation in a second direction,
in a third relative rotational position, the respective pawl engages the tooth profile to prevent rotation of the outer ring with respect to the inner ring in the second direction while permitting relative rotation in the first direction,
in a fourth relative rotational position, the respective pawl engages the tooth profile to prevent rotation of the outer ring with respect to the inner ring in both the first and second directions;
a spring cage supported for rotation through a second range less than the first range with respect to the inner ring, wherein the ratcheting springs are secured to the spring cage; and
a plurality or return springs acting between the cam ring and the spring cage.

12. The switchable clutch of claim 11 wherein the first relative rotational position is between the second relative rotational position and the third relative rotational position.

13. The switchable clutch of claim 12 wherein the second relative rotational position is between the first relative rotational position and the fourth relative rotational position.

14. The switchable clutch of claim 13 wherein:
in a fifth relative rotational position of the cam ring with respect to the inner ring, each ratcheting spring positions the respective pawl with respect to the outer ring such that the respective pawl engages the tooth profile to prevent rotation of the outer ring with respect to the inner ring in both the first and second directions; and
the third relative rotational position is between the first relative rotational position and the fifth relative rotational position.

15. The switchable clutch of claim 11 wherein rotation of the spring cage with respect to the inner ring changes a center of force of the ratcheting springs on the pawls thereby urging the pawls to tilt into engagement with the tooth profile.

16. The switchable clutch of claim 11 wherein each pawl of the plurality of pawls comprises:
a first arm configured to engage the tooth profile to prevent relative rotation in the first direction; and
a second arm configured to engage the tooth profile to prevent relative rotation in the second direction.

* * * * *